US012568107B2

(12) United States Patent 
Kern et al.

(10) Patent No.: US 12,568,107 B2 
(45) Date of Patent: Mar. 3, 2026

(54) METHOD TO REDUCE USERS FROM FALLING VICTIM OF RANSOMWARE

(71) Applicant: Lenovo Enterprise Solutions (Singapore) Pte. Ltd., New Tech Park (SG)

(72) Inventors: Eric R Kern, Chapel Hill, NC (US); Robert Furda, Bratislava (SK); MD Kamrul Hasan, Romansville, PA (US); Mahesh Bharadwaj, Melbourne (AU)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 255 days.

(21) Appl. No.: 18/129,514

(22) Filed: Mar. 31, 2023

(65) Prior Publication Data

US 2024/0333745 A1 Oct. 3, 2024

(51) Int. Cl.
*H04L 29/00* (2006.01)
*H04L 9/40* (2022.01)

(52) U.S. Cl.
CPC ........ *H04L 63/1433* (2013.01); *H04L 63/083* (2013.01); *H04L 63/102* (2013.01); *H04L 63/105* (2013.01); *H04L 63/1425* (2013.01); *H04L 63/20* (2013.01)

(58) Field of Classification Search
CPC . H04L 63/1433; H04L 63/083; H04L 63/102; H04L 63/105; H04L 63/1425; H04L 63/20
See application file for complete search history.

(56) References Cited

U.S. PATENT DOCUMENTS

| | | | | |
|---|---|---|---|---|
| 9,438,613 | B1 * | 9/2016 | Paithane | ............. H04L 63/1425 |
| 10,469,525 | B2 * | 11/2019 | Hittel | .................... G06F 21/552 |
| 10,776,484 | B2 * | 9/2020 | Nagata | ...................... H04L 9/10 |
| 10,868,820 | B2 * | 12/2020 | Sites | ....................... H04L 63/14 |
| 11,349,855 | B1 * | 5/2022 | Amit | ....................... G06F 9/547 |
| 11,803,792 | B2 * | 10/2023 | Makhija | ................. G06Q 10/08 |
| 2011/0265162 | A1 * | 10/2011 | Alavandar | ............ G06F 21/577 |
| | | | | 726/7 |
| 2017/0244740 | A1 * | 8/2017 | Mahabir | ............. H04L 63/1433 |

(Continued)

OTHER PUBLICATIONS

Troesch et al., "Machine Learning for Network Intrusion Detection", Final Report for CS 229, Fall 2014, pp. 1-5.

(Continued)

*Primary Examiner* — Don G Zhao
(74) *Attorney, Agent, or Firm* — Kunzler Needham & Hilton; Bruce R. Needham

(57) ABSTRACT

A method and computer program product to reduce users from falling victim of ransomware is disclosed. The method includes periodically administering, by a processor, a security awareness test to a user and generating a security awareness score based on user performance. The security awareness test assesses knowledge of the user with respect to ransomware and cybersecurity protocols of a computer system. The method includes monitoring compliance of the user with the ransomware and cybersecurity protocols and updating the security awareness score in response to changes to the performance and/or compliance. The updated security awareness score is embedded into a security chip of a hardware device of the computer system.

12 Claims, 7 Drawing Sheets

(56) References Cited

U.S. PATENT DOCUMENTS

| | | | | |
|---|---|---|---|---|
| 2018/0034835 | A1* | 2/2018 | Iwanir | H04L 63/1416 |
| 2018/0152402 | A1* | 5/2018 | Tsou | G06Q 10/107 |
| 2018/0205754 | A1* | 7/2018 | North | H04L 63/145 |
| 2018/0278647 | A1* | 9/2018 | Gabaev | H04L 63/1425 |
| 2018/0288080 | A1* | 10/2018 | Keller | H04L 63/1425 |
| 2018/0365439 | A1* | 12/2018 | Milman | H04L 51/42 |
| 2019/0052664 | A1* | 2/2019 | Kibler | G06F 11/301 |
| 2020/0177612 | A1* | 6/2020 | Kras | G06N 20/00 |
| 2020/0177614 | A1* | 6/2020 | Burns | G06F 21/577 |
| 2020/0220892 | A1* | 7/2020 | Gibson | H04L 63/1441 |
| 2020/0267183 | A1* | 8/2020 | Vishwanath | H04L 63/1483 |
| 2020/0285737 | A1* | 9/2020 | Kraus | G06F 21/552 |
| 2020/0287917 | A1* | 9/2020 | Sites | G06F 21/577 |
| 2021/0006584 | A1* | 1/2021 | Basballe Sorensen | |
| | | | | G06Q 10/105 |
| 2021/0064758 | A1* | 3/2021 | Zettel, II | G06F 21/577 |
| 2021/0084049 | A1 | 3/2021 | Kartoun et al. | |
| 2021/0126944 | A1* | 4/2021 | Lesperance | H04L 63/1433 |
| 2021/0232472 | A1* | 7/2021 | Nagaraj | H04L 43/20 |
| 2022/0060499 | A1* | 2/2022 | Huda | H04L 63/1416 |
| 2022/0131900 | A1* | 4/2022 | Karin | G06N 20/00 |
| 2022/0150265 | A1* | 5/2022 | Marett | G06F 21/64 |
| 2022/0210171 | A1* | 6/2022 | Grossman | H04L 63/10 |
| 2022/0345485 | A1* | 10/2022 | Kras | H04L 51/212 |
| 2023/0098508 | A1* | 3/2023 | Mishra | H04L 63/1458 |
| | | | | 726/23 |
| 2023/0325632 | A1* | 10/2023 | Kasmani | G06N 20/20 |
| | | | | 706/15 |
| 2023/0344860 | A1* | 10/2023 | Agranonik | G06F 21/561 |
| 2024/0143761 | A1* | 5/2024 | Veprinsky | G06F 21/566 |
| 2024/0144275 | A1* | 5/2024 | Ammatanda | G06N 5/01 |
| 2024/0289489 | A1* | 8/2024 | Ezrielev | G06F 21/6218 |

OTHER PUBLICATIONS

Dwoskin, "Facebook is rating the trustworthiness of its users on a scale from zero to 1", The Washington Post, Aug. 21, 2018, pp. 1-3.
"The security ratings, response, and resilience company.", SecurityScorecard, date website was accessed Nov. 29, 2022, pp. 1-7.

* cited by examiner

Security Awareness Apparatus
102

Test Administration Module
202

Score Generation Module
203

Compliance Module
204

Security Awareness Score Update Module
206

Hardware Integration  Module
208

Secured System Access Apparatus
130

300

Secured System Access Module
130

Request Module
302

Query Module
304

Authentication Validation Module
306

Access Module
308

400

Begin

402   Administer Security Awareness Test

404   Generate Score

406   Monitor for Compliance

408   Change Score?

No

Yes

410   Update Score

412   Embed Score

End

METHOD TO REDUCE USERS FROM FALLING VICTIM OF RANSOMWARE

FIELD

The subject matter disclosed herein relates to computer security protocols and more particularly relates to computer security protocols for reducing users from falling victim of ransomware.

BACKGROUND

Cybersecurity systems are increasingly relied upon as the first line of defense against malware that results in unauthorized information disclosure, data theft, damage to computer hardware, software, and data, and system disruption. Ransomware that targets the user is particularly prevalent in the computer industry and difficult to protect against.

Current security certification and training processes tend to rely on a blanket set of tests given a single time, where the test results are pass/fail. These tests are inadequate to protect against ransomware that targets the end user. What is needed is a standardized cybersecurity testing system that monitors cybersecurity knowledge and awareness on a continuous basis. Further what is needed is a standardized cybersecurity testing system that grants varying levels of access to a computer system depending on a user's demonstrated test performance and compliance with cybersecurity protocols.

BRIEF SUMMARY

A method to reduce users from falling victim of ransomware is disclosed. A computer program product also performs the functions of the method. The method includes periodically administering, by a processor, a security awareness test to a user and generating a security awareness score based on user performance. The security awareness test assesses knowledge of the user with respect to ransomware and cybersecurity protocols of a computer system. The method includes monitoring compliance of the user with the ransomware and cybersecurity protocols and updating the security awareness score in response to changes to the performance and/or compliance. The method includes embedding the updated security awareness score into a security chip of a hardware device of the computer system.

Another embodiment of a method includes receiving, by a processor, a request from a user to access a computer system and querying, by the processor, the user for authentication credentials to validate a user identity. The authentication credentials include a username and a password. In some embodiments, the authentication credentials further include second-level authentication credentials including a rolling code. In some embodiments, the method may include validating, by the processor, the user identity based on the authentication credentials and accessing, by the processor, a security awareness score of the user. The processor accesses the security awareness score and compares the security awareness score to a score threshold required for access to the computer system. If the security awareness score does not meet the score threshold, the processor denies the user access to at least a portion of the computer system.

A computer program product to perform the functions of the method is also disclosed. The computer program product includes a non-transitory computer readable storage medium storing code configured to be executable by a processor to perform operations. The operations include periodically administering a security awareness test to a user that assesses knowledge of the user with respect to ransomware and cybersecurity protocols of a computer system. The operations further include generating a security awareness score for the user based on performance of the user on the security awareness test. Compliance of the user with the ransomware and cybersecurity protocols during use of the computer system are monitored and the security awareness score is updated in response to changes to the performance and/or the compliance. The updated security awareness score is embedded into a security chip of a hardware device of the computer system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
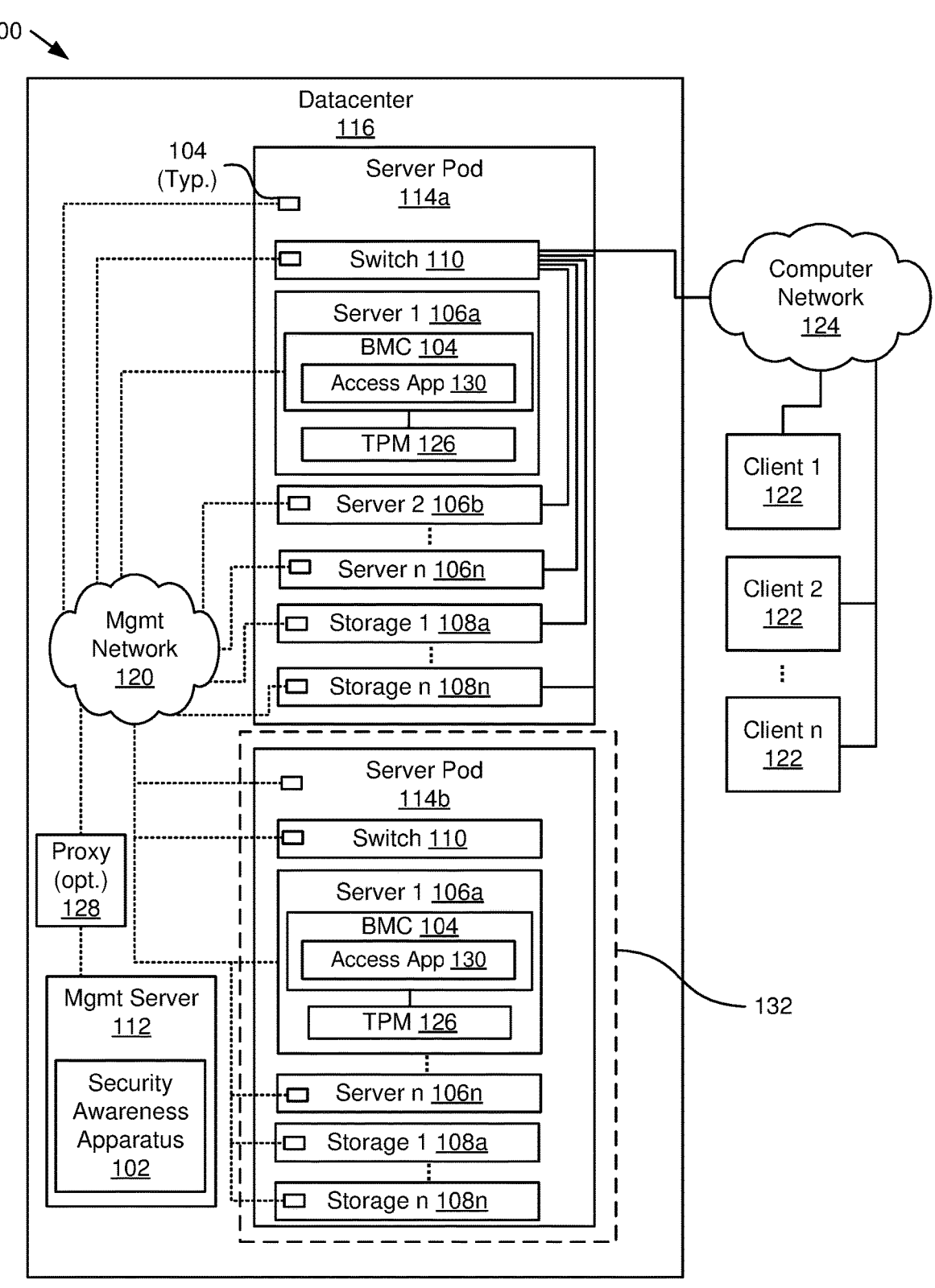
FIG. 1 is a schematic block diagram illustrating a system for security awareness, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R. Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to." unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method to reduce users from falling victim of ransomware is disclosed. According to one aspect of the disclosure, the method includes periodically administering, by a processor, a security awareness test to a user and generating a security awareness score based on user performance. The security awareness test assesses knowledge of the user with respect to ransomware and cybersecurity protocols of a computer system. The method includes monitoring compliance of the user with the ransomware and cybersecurity protocols during use of the computer system and updating the security awareness score in response to changes to the performance and/or the compliance. The method includes embedding the updated security awareness score into a security chip of a hardware device of the computer system.

In some embodiments, the security awareness test further assesses knowledge of the user with respect to cybercrime awareness and virus awareness. In some embodiments, the processor prompts the user to obtain further training in the event that the user is denied access to a portion of the system. In some embodiments, the processor generates the security awareness test. In some embodiments, the questions of the security awareness test change over time based on new threats, current conditions, to further assess skills of users, etc. In some embodiments, test questions change from test to test. The security awareness test includes a written component and a live action component.

In some embodiments, the method includes determining a required level of access to enable access to a portion of the computer system. Some embodiments include verifying that a user level of access corresponds to the required level of access. In some embodiments, the method further includes automatically updating, by the processor, the user level of access in response to the updated security awareness score. Embedding the updated security awareness score into the security chip may include embedding the user level of access into the security chip.

In some embodiments, periodically administering the security awareness test includes periodically administering the security awareness test to the user in response to a request from the user to access the computer system. In some embodiments, the processor denies the user access to the at least a portion of the computer system in the event that the updated security awareness score does not meet a score threshold.

In certain embodiments, denying the user access to the at least a portion of the computer system comprises receiving, by a processor, a request from the user to access the computer system. In some embodiments, the processor queries the user for authentication credentials to validate a user identity. The authentication credentials include a username and a password. In some embodiments, the processor validates the user identity based on the authentication credentials. In some embodiments, the method further includes accessing, by the processor, the updated security awareness score of the user and comparing, by the processor, the security awareness score to a score threshold required for access to the computer system. In some embodiments, the processor denies the user access to the at least a portion of the computer system in the event the security awareness score does not meet the score threshold. In other embodiments, the method includes automatically decreasing the security awareness score of the user on one of a periodic basis or a random basis to by an amount sufficient to prevent the user from accessing at least a portion of the computing system, and the method includes administering an additional security awareness test to the user to allow the user an opportunity to regain access to the at least a portion of the computer system.

According to a second aspect of the disclosure, a method includes receiving, by a processor, a request from a user to access a computer system and querying, by the processor, the user for authentication credentials to validate a user identity. The authentication credentials include a username and a password. In some embodiments, the authentication credentials further include second-level authentication credentials including a rolling code. In some embodiments, the method may include validating, by the processor, the user identity based on the authentication credentials and accessing, by the processor, a security awareness score of the user. The processor compares the security awareness score to a score threshold required for access to the computer system and denies the user access to at least a portion of the computer system in the event the security awareness score does not meet the score threshold.

In some embodiments, the method includes accessing the security awareness score from a security chip of a hardware device in the computer system. The security awareness score may be embedded in the security chip. In some embodiments, the security awareness score corresponds to performance of the user on a security awareness test. In some embodiments, denying the user access includes denying, by the processor, the user access in the event a user level of access does not meet a required level of access for the computer system. In some embodiments, denying the user access further includes prompting, by the processor, the user to obtain further training.

In some embodiments, the method further includes periodically administering, by a processor, the security awareness test to the user. The security awareness test assesses knowledge of the user with respect to ransomware and cybersecurity protocols of a computer system. In some embodiments, the method includes generating, by a processor, the security awareness score of the user based on performance of the user on the security awareness test and monitoring, by a processor, compliance of the user with the ransomware and cybersecurity protocols during use of the computer system. The processor may update the security awareness score in response to changes to the performance and/or the compliance. In some embodiments, the method includes embedding, by a processor, the updated security awareness score of the user into a security chip of a hardware device of the computer system. In certain embodiments, the hardware device communicates with the processor to deny the user access to the at least a portion of the computer system based on the updated security awareness score.

According to a third aspect of the disclosure, a computer program product includes a non-transitory computer readable storage medium storing code configured to be executable by a processor to perform operations. In some embodiments, the operations include periodically administering a security awareness test to a user. The security awareness test assesses knowledge of the user with respect to ransomware and cybersecurity protocols of a computer system. In some embodiments, the operations further include generating a security awareness score for the user based on performance of the user on the security awareness test and monitoring compliance of the user with the ransomware and cybersecurity protocols during use of the computer system. Some embodiments further include updating the security awareness score in response to changes to the performance and/or the compliance and embedding the updated security awareness score for the user into a security chip of a hardware device of the computer system. In some embodiments, the operations further include denying the user access to at least a portion of the computer system based on the updated security awareness score.

FIG. 1 is a schematic block diagram illustrating a system 100 for security awareness and compliance, according to various embodiments. The system 100 includes a security awareness apparatus 102 in a baseboard management controller ("BMC") 104 where there is a BMC 104 in various computing devices of the system 100, such as servers 106 (e.g., server 1 106a, server 2 106b, . . . server n 106n), storage devices 108 (e.g., storage device 1 108a . . . storage device n 108n), switches 110, etc. in one or more server pods 114a-n. The BMCs 104 are connected to a management server 112 over a management network 120. The server pods 114a-n and management server 112 are depicted in a datacenter 116 but may be in another location. In other embodiments, the servers 106, storage devices 108, switches 110, etc. are not located in server pods 114a-n.

The management server 112 manages the BMCs 104, which manage the computing devices (e.g., 106, 108, 110, etc.) in which they reside. The management server 112 communicates over an internal management network 120 with a security awareness apparatus 102. In some embodiments, the security awareness apparatus 102 is stored on a remote management server (not shown) which may be used by a system administrator or other user to manage and control the computing devices.

The computing devices (e.g., 106, 108, 110, etc.) of the system 100, in some embodiments, communicate with clients 122 and other devices over a computer network 124 separate from the internal management network 120. In other embodiments, the management server 112 communicates with the security awareness apparatus 102 over the computer network 124. In such embodiments, the management server 112 communicates with the security awareness apparatus 102 using a secure communication method, such as encryption, a virtual private network ("VPN"), etc. In some embodiments, the internal management network 120 uses some or all of the elements in the computer network 124.

In some embodiments, the servers 106, storage devices 108, and switches 110 are rack-mounted equipment in a server pod 114. In other embodiments, one or more of the servers 106, storage devices 108, and switches 110 are not rack mounted. In some embodiments, the servers 106 are blade servers. The servers 106 may be edge servers, desktop computers, workstations, a mainframe computer, or other type of server managed by a BMC 104. The storage devices 108 may be rack mounted, may be mounted in a cabinet, may be standalone, etc. The switches 110 may be rack-mounted, may reside in a cabinet, etc. The system 100 may also include other devices, such as power supplies, etc. that may be monitored by a BMC 104.

The security awareness apparatus 102, in some embodiments, runs on a separate computing device, such as a desktop computer, a workstation, a laptop computer, a tablet computer, a rack-mounted computer, or other computing device capable of connecting with the management server 112. In some embodiments, the security awareness apparatus 102 is on a remote management server.

In some embodiments, the management network 120 is a private network on a subnet or the like. In some embodiments, the management network 120 includes switches, cables, and other network devices to facilitate communication between the BMCs 104 and the management server 112.

In some embodiments, the management network 120 includes a proxy 128 that combines data traffic to and from the BMCs 104 to a single stream. In other embodiments, the proxy 128 is not included in the system 100. In some embodiments, the single stream of communications from the BMCs 104 is directed to the management server 112. In some embodiments, the proxy 128 includes some firewall functions. The proxy 128, in some embodiments, is called a proxy server. Using a proxy 128, in some embodiments, provides advantages, such as use as a firewall, a web filter, provides shared network connections, and may cache data to speed up common requests. In some embodiments, the proxy 128 includes a router. In some embodiments, the router includes a firewall. One of skill in the art will recognize other advantages of using a proxy 128.

A BMC 104 provides access to computing devices of the datacenter 116 through the management server 112. One example of a BMC 104 is a Lenovo® XClarity® Controller ("XCC"). The datacenter 116 includes one or more management servers 112 in communication with the BMCs 104 located in the various computing devices of the datacenter 116.

Typically, the BMC 104 is connected to the internal management network 120 separate from a computer network 124 used by virtual machines ("VMs"), containers, servers 106, etc. for communications, workloads, etc. The BMCs 104 typically have access to various components of the servers 106 and other computing devices and are able to control the components, gather data, report alerts and data from the components and manage the components. In some embodiments, a BMC 104 is able to access components of a server 106 when the server 106 is not running and is often able to reboot the server 106. The BMC 104 may also access other computing devices when the other computing devices are not running.

In some embodiments, the BMCs 104 of the servers 106, storage devices 108, etc. are connected to a management server 112 that acts as a gateway for external communications. The management server 112, in some embodiments, is a Lenovo XClarity Administrator ("LXCA"). In some embodiments, the management server 112 is accessible over a private and/or secure connection. In some embodiments, a system administrator is able to access the management server 112 via virtual private network ("VPN") over a public computer network, such as the Internet. In other embodiments, the secure connection between the management server 112 and other devices is implemented using another secure communications protocol.

In some embodiments, as discussed in more detail with respect to FIG. 2 below, the management server 112 includes a security awareness apparatus 102. In some embodiments, the security awareness apparatus 102 may be located on one or more other servers 106 or other computing devices in the datacenter 116 that is accessible by the management server 112. In some embodiments, the security awareness apparatus 102 may communicate with users in the datacenter 116 via a user interface. In some embodiments, the user interface may be configured to enable the client to request access to a computer system by providing login information, such as a username and password. In some embodiments, the security awareness apparatus 102 may communicate with the user via the user interface to administer a security awareness test to assess the user's knowledge with respect to ransomware and cybersecurity protocols of a computer system.

In some embodiments, the security awareness apparatus 102 periodically administers the security awareness test to users weekly, monthly, quarterly, or on any other regular periodic basis. In other embodiments, the security awareness apparatus 102 administers the security awareness test on a randomized basis. In certain embodiments, the security awareness apparatus 102 administers the security awareness test to the user in response to the user's request to access a computer system.

Upon completion of the security awareness test, the security awareness apparatus 102 generates a security awareness test score for the user. The security awareness test score may provide a metric or other indicator of the user's performance on the security awareness test.

In some embodiments, the security awareness apparatus 102 may enable the management server 112 to continuously or periodically monitor user compliance with ransomware and cybersecurity protocols, and to update the security awareness test score in response to changes in the security awareness test score and/or compliance. In some embodiments, the user's level of access may be automatically adjusted in response to the updated security awareness test score. For example, the user's security awareness score may be reduced if the user fails to demonstrate compliance with ransomware and cybersecurity protocols during computer system use. In some embodiments, the reduced security awareness score may automatically drop the user's access level such that the user may no longer access the computer system or may be restricted from accessing certain portions of the computer system. Similarly, in some embodiments, the security awareness score may be increased, or the user may be prompted to retake the security awareness test if the user demonstrates exceptional compliance with established security protocols. An improved security awareness score may automatically increase the user's access level such that the user may access additional components and/or functions of the computer system.

The updated security awareness test score may be embedded in a security chip, such as a trusted platform module ("TPM") 126 of a server 106 in communication with a BMC 104 of the server 106. FIG. 1 depicts a TPM 126. As used herein, "TPM" and security chip are used interchangeably. One of skill in the art will recognize that a security chip may be implemented in other ways.

For example, in some embodiments, a server pod 114b may be maintained in a secure area 132 that is partitioned from other parts of the datacenter 116. In these and other embodiments, the security awareness apparatus 102 may send security awareness test scores and updates directly to the TPMs 126 of the servers 106 and other equipment in the secure area 132. In the event a user requests access to any server 106 or other equipment in the secure area 132, some embodiments of the security awareness apparatus 102 may utilize a secured system access apparatus 130 to determine whether to allow the user access based on the security awareness test score.

In some embodiments, the secured system access apparatus 130 may be stored in the BMC 104. In some embodiments, the secured system access apparatus 130 may access the security awareness test score of the user from the TPM 126 to verify user competency (as demonstrated by the security awareness score and compliance) prior to granting the user access to the computer system. In some embodiments, the secured system access apparatus 130 limits user access to certain machines, files, and/or communication systems within the computer system depending on the user's updated security awareness test score. The security awareness apparatus 102 is described in more detail in the apparatus 200 of FIG. 2 and the secured system access apparatus 130 is described in more detail in the apparatus 300 of FIG. 3.

The management network 120 and computer network 124 include one or more network types, such as a LAN, a WAN, a fiber network, a cellular network, a fiber network, or the like. The management network 120 and/or computer network 124 include network devices, such as servers, switches, routers, cabling, patch panels, and the like. The management network 120 is located in the datacenter 116 or location where the computing equipment (e.g., 106, 108, 110, 112, 115, etc.) is located, but may include connections to allow system administrators and/or other users to access the management network 120 locally. The computer network 124, in some embodiments, includes the Internet and may include other networks, such as a LAN, a WAN, etc. and typically includes a higher bandwidth than the management network 120 to allow servers 106 and other computing devices in the datacenter 116 to communicate at an appropriate scale with the clients 122.

Some embodiments may employ a wireless connection such as a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 2:
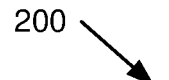
FIG. 2 is a schematic block diagram illustrating an apparatus for security awareness, according to various embodiments.

FIG. 2 is a schematic block diagram illustrating an apparatus 200 for security awareness, according to various embodiments. In some embodiments, the apparatus 200 includes a security awareness apparatus 102 having a test administration module 202, a score generation module 203, a compliance module 204, a security awareness score update module 206, a hardware integration module 208, and a secured system access apparatus 130, as described in more detail below. In some embodiments, the apparatus 200 is implemented with code stored on one or more computer readable storage media, which are non-transitory. In other embodiments, some or all of the apparatus 200 is implemented with a programmable hardware device, such as an FPGA, and some or all of the apparatus 200 may also be implemented with hardware circuits.

In some embodiments, the test administration module 202 is configured to periodically administer, by a processor, a security awareness test to a user, where the security awareness test assesses knowledge of the user with respect to ransomware and cybersecurity protocols of a computer system. In some embodiments, the test administration module 202 is configured to administer the security awareness test to a user in response to a request from the user to access the computer system.

Various embodiments of the security awareness test are designed to limit system access to personnel that don't have the requisite knowledge or experience to avoid hacking, phishing, or other schemes that could compromise system integrity. Embodiments described herein thus provide another layer of protection against ransomware and other cybersecurity tactics that target the end user.

In some embodiments, the processor generates the security awareness test. Some embodiments of the security awareness test include a written component and a live action component. In some embodiments, the written component poses questions to the user to test the user's knowledge regarding cybersecurity, ransomware, and security protocols of a computer system, such as the system 100 of FIG. 1. In some embodiments, the written component of the security awareness test poses further questions to the user to assess knowledge of the user with respect to cybercrime awareness and virus awareness. In some embodiments, the live action component may simulate hacking or phishing scenarios to determine whether the user's actions comport with the cybersecurity, ransomware, and security protocols. In other embodiments, the live action component may require the user to identify the hacking or phishing scenarios.

In certain embodiments, the score generation module 203 is configured to generate a security awareness score for the user based on performance of the user on the security awareness test. In some embodiments, the security awareness score may include a metric of the user's performance. For example, in some embodiments, the security awareness score may be a numerical score between 0 and 100. In other embodiments, the numerical score may be between 0 and 1, or may include any suitable numerical range or other range. In some embodiments, the security awareness score may include a performance category or designation indicating user competency based on the user's performance. For example, in some embodiments, the user's performance may be designated or categorized as basic, novice, intermediate, advanced, or expert.

In some embodiments, the security awareness score may be associated with a level of access to the computer system. In some embodiments, data on the computer system may be bound to different user access levels. In some embodiments, the data and/or computer system may be partitioned such that users with lower levels of access may be denied access to sensitive data or portions of the computer system. In some embodiments, various threshold scores may correspond to the various levels of access. In some embodiments, the user security awareness score may be compared to the threshold score to determine the user level of access.

For example, in some embodiments, each threshold score or range of threshold scores may correspond with each security level of the computer system. In some embodiments, the computer system may be partitioned to include multiple security levels ranging from a basic level authorizing access to basic system functions, chatrooms, and non-sensitive data to a high security level enabling access to highly sensitive data demanding the highest levels of protection. In some embodiments, machines storing highly sensitive data and/or communications may require the highest level of security access. The user security awareness score may be compared to the threshold score or range of scores to limit the user's access to the computer system accordingly. In this manner, some embodiments ensure that only the most security-aware users have access to the most sensitive data.

In some embodiments, the compliance module 204 is configured to continuously or periodically monitor compliance of the user with the ransomware and cybersecurity protocols during use of the computer system and generates a compliance score. For example, in some embodiments, the compliance module 204 is configured to track and record the user's response to events such as receiving an actual or spoofed phishing email. In other embodiments, the compliance module 204 is configured to monitor compliance of the user on an intermittent or periodic basis.

In some embodiments, the compliance module 204 is configured to generate a numerical value to increase or decrease the security awareness score. In other embodiments, the compliance module 204 is configured to generate a pass or fail designation such that, in some embodiments, the compliance module 204 is configured to override the security awareness score. In some embodiments, the compliance module 204 is configured to continuously or periodically monitor user behavior and augments the security awareness score in real time. In other embodiments, the compliance module 204 is configured to continuously or periodically monitor user behavior and augments the security awareness score on an intermittent or periodic basis.

In other embodiments, the compliance module 204 is configured to automatically decrease the security awareness score of the user on a periodic or random basis, thereby automatically preventing the user from accessing at least a portion of the computer system. In this manner, some embodiments of the compliance module 204 may be configured to force the user to obtain further training and/or re-take the security awareness test to regain access the computer system or to regain access to a portion of the computer system. In some embodiments, the compliance module 204 may be configured to require the user to demonstrate a passing security awareness score or to demonstrate an improved security awareness score to regain access to the computer system. In some embodiments, the compliance module 204 may be configured to require the user to take a different security awareness test to regain access to the computer system. For example, the compliance module 204 may be configured to prevent user from accessing the computer system until the user receives a passing security awareness score on a security awareness test designed to test knowledge and compliance with additional protocols, such as cybercrime and virus awareness protocols.

In some embodiments, the security awareness score update module 206 is configured to automatically update the security awareness score in response to changes to the user's performance and/or compliance. In some embodiments, the security awareness score update module 206 is configured to update the security awareness score in real time. In other embodiments, the security awareness score update module 206 is configured to update the security awareness score periodically in response to a change to the security awareness score and/or compliance score. In still other embodiments, the security awareness score update module 206 is configured to update the security awareness score and/or compliance score on a regular (e.g., quarterly) or randomized basis. In this manner, the security awareness score update module 206 may be configured to provide a reliable, real-time assessment of user knowledge and behavior to protect sensitive data from unsafe users.

In some embodiments, the user may automatically lose access to certain data, files, chatrooms, or other portion of the computer system if the user's security awareness score and/or compliance score falls below a pre-determined threshold. In this event, in some embodiments, the user may be prompted to obtain further training and/or retake the security awareness test to increase the user's security awareness score. In some embodiments, the user may be required to re-take the security awareness test within a designated period of time. If the user does not re-take the security awareness test within that period of time, the security awareness score may be automatically reduced and/or the user may be automatically locked out of the system until the security awareness test is re-taken and the user achieves a passing score.

In some embodiments, the hardware integration module 208 is configured to communicate with the security awareness score update module 206 to securely store the security awareness score. In some embodiments, the hardware integration module 208 may also be configured to store the user level of access and/or other information associated with the user, such as user authentication credentials. In some embodiments, the user authentication credentials include first-level authentication credentials including a username and password, for example. In other embodiments, the user authentication credentials include second-level authentication credentials such as a rolling code. Thus, in certain embodiments, the security awareness score may provide an additional level of authentication on top of first-level (e.g., username and password) and second-level (e.g., rolling code) authentication credentials.

In some embodiments, the hardware integration module 208 is configured to embed the updated security awareness score, user level of access, and/or other information into a hardware device of the computer system. In some embodiments, the updated security awareness score is embedded into a security chip such as a TPM 126. The TPM 126 may include a dedicated microcontroller with integrated cryptographic keys. In some embodiments, the TPM 126 may be included in a hardware device such as a server 106, laptop, phone, or the like. In other embodiments, the updated security awareness score and/or other user information may be embedded in more than one security chip and/or more than one hardware device. In still other embodiments, storage of the security awareness score and/or other user information may be distributed across various security chips and/or hardware devices. In these and other embodiments, hardware may be secured at the management infrastructure level while also preventing access to any of the systems through the BMC 104 or configuration settings.

Figure 3:
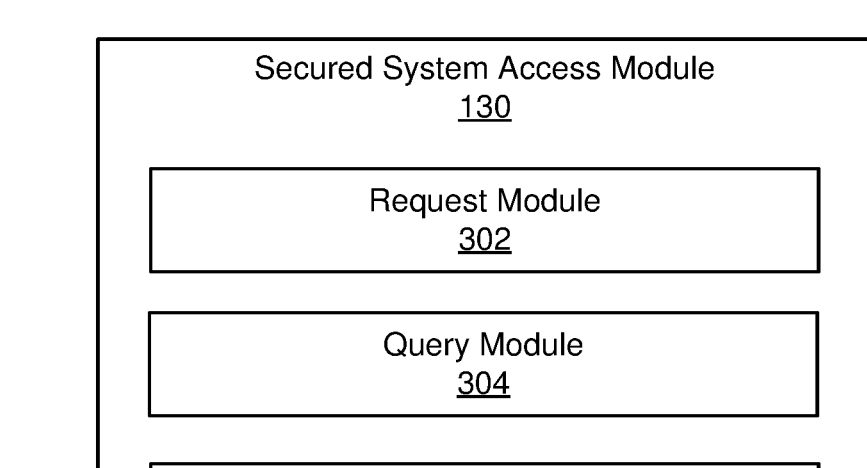
FIG. 3 is a schematic block diagram illustrating an apparatus for secured system access, according to various embodiments.

FIG. 3 is a schematic block diagram illustrating an apparatus 300 for secured system access, according to various embodiments. In some embodiments, the apparatus 300 includes a secured system access apparatus 130. The secured system access module 130 may cooperate with the security awareness apparatus 102 to confirm user credentials prior to granting user access. In some embodiments, the secured system access apparatus 130 includes a request module 302, a query module 304, an authentication validation module 306, and/or an access module 308, which are described below.

In some embodiments, the secured system access apparatus 130 may be implemented by code. In some embodiments, the code may be stored on one or more computer readable storage devices, such as a server 106*a-n* located in the server pod 114*a* and/or a server 106*a-n* located in the secure server pod 114*b*. In other devices, the code may be loaded onto one or more computers, other programmable data processing apparatuses, or other hardware devices, such as the management server 112 and/or a computer 122. In one embodiment, the code may be implemented by a special purpose hardware-based system.

In some embodiments, the request module 302 is configured to receive a request from a user to access a computer system, or portion thereof. For example, in some embodiments, the request my include an attempt to access the computer system via a website, a login screen, a configuration screen, a voice recognition system, a face recognition system, fingerprint recognition system, or any other biometric identification system or other suitable mode of access. In other embodiments, the request may include an attempt to access one or more secure files, folders, or chatrooms within the computer system, and/or other portions of the computer system.

The query module 304 is configured to query the user for authentication credentials in response to the request module 302 receiving the request. In some embodiments, the query module 304 is configured to query the user for a username and a password to validate the user's identity. In some embodiments, the query module 304 is further configured to require second-level authentication credentials to validate the user's identity. Second-level authentication credentials may include, for example, a rolling code, biometric identification information such as a fingerprint, a retinal scan, facial recognition, or other suitable second-level credential information.

In some embodiments, the authentication validation module 306 is configured to validate the user identity based on the authentication credentials. In some embodiments, the authentication validation module 306 may be located on a management server 112 or other computing device in communication with the server via a secure management network 120. In some embodiments, the authentication validation module 306 may access stored credentials from a secure location on one or more computer readable storage devices and may compare the stored credentials of the user to the authentication credentials provided to validate the user identity. The computer readable storage device may be, for example, but not limited to, an electronic, magnetic, optical, electromagnetic, infrared, holographic, micromechanical, or semiconductor system, apparatus, or device, or any suitable combination of the foregoing. If the stored credentials match the authentication credentials, some embodiments of the authentication validation module 306 may be configured to access the security awareness score of the user to further authenticate the user.

Some embodiments may utilize a secure area 132, such as an air-gap network, to physically isolate a computer system storing highly sensitive data from unsecured networks. To maximize security, the secure area 132 may not include network interfaces connected to outside networks. Accordingly, the access module 308 and the security awareness score may both be stored on the server itself, thereby enabling the authentication validation module 306 to access the security awareness score. For example, in some environments, the security awareness score may be embedded into the TPM 126 of the server and may be accessible by the authentication validation module 306 located on the BMC 104 of the server 106.

In some embodiments, the access module 308 is configured to compare the security awareness score to a pre-determined score threshold required for access to the computer system, or portion of the computer system. In some embodiments, the access module 308 is configured to deny the user access to the computer system, or portion thereof, in the event the security awareness score does not meet the pre-determined score threshold.

For example, in some embodiments, the pre-determined score threshold may include a numerical value between 0-100 or 0-1 or another pre-defined numerical range. In some embodiments, the security awareness score is also a numerical value within the same range. If the security awareness score is equal to or greater than the pre-determined score threshold, the user may be granted access to the desired computer system or portion thereof. If the security awareness score is less than the pre-determined score threshold, access to the computer system may be denied.

In the event that access is denied, in some embodiments, the user may be prompted to obtain further training and/or retake the security awareness test to improve the security awareness score. In some embodiments, the user may be temporarily or permanently locked out of the computer system. In some embodiments, the access module 308 may automatically reconfigure the passwords, keys, or the like to lock the user out of the computer system. In these and other embodiments, the access module 308 may lock down the associated computer hardware.

Figure 4:
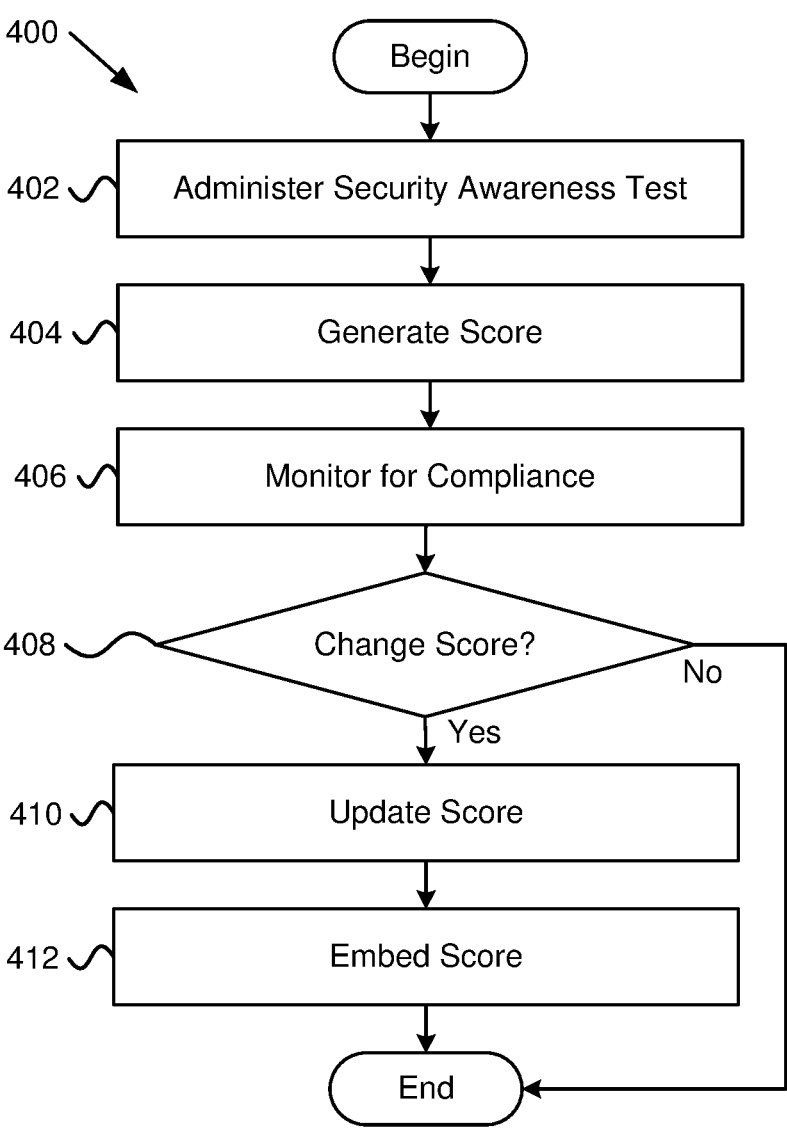
FIG. 4 is a schematic flow chart diagram illustrating a method for generating a security awareness score, according to various embodiments.

Referring now to FIG. 4, some embodiments of a method 400 for reducing users from falling victim of ransomware includes periodically administering 402, by a processor, the security awareness test to the user. The security awareness test assesses knowledge of the user with respect to ransomware and cybersecurity protocols of a computer system. In some embodiments, the method 400 includes generating 404, by a processor, the security awareness score of the user based on performance of the user on the security awareness test and monitoring 406, by a processor, compliance of the user with the ransomware and cybersecurity protocols during use of the computer system. Some embodiments of the method 400 may include determining 408 whether the performance or the compliance has changed. In some embodiments, the processor may update 410 the security awareness score in response to changes to the performance and/or the compliance. The method 400 may include embedding 412, by a processor, the updated security awareness score of the user into a security chip of a hardware device of the computer system. In certain embodiments, the hardware device communicates with the processor to deny the user access to the at least a portion of the computer system based on the updated security awareness score.

Figure 5:
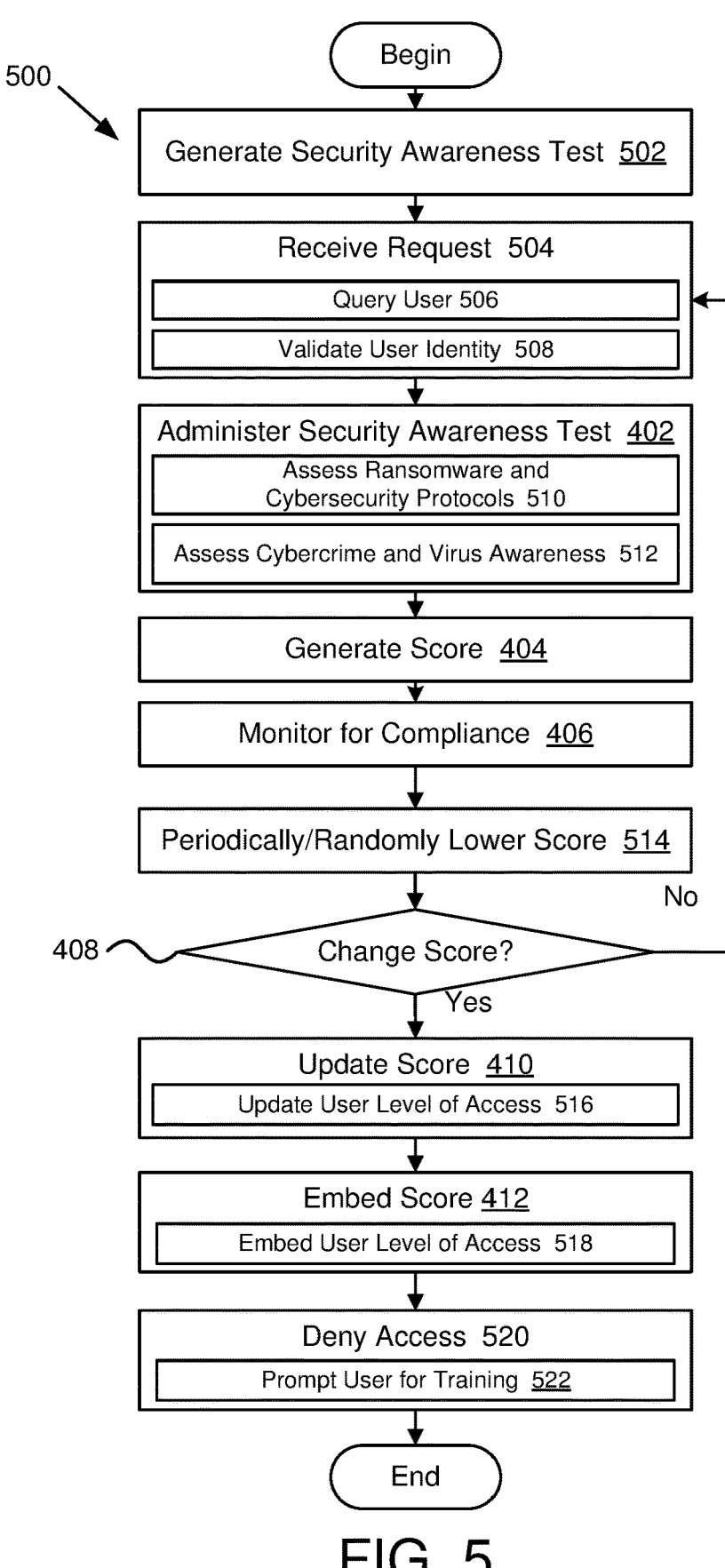
FIG. 5 is a schematic flow chart diagram illustrating an alternative embodiment of a method for generating a security awareness score.

Referring now to FIG. 5, in some embodiments, a method 500 for reducing users from falling victim of ransomware includes generating 502, by the processor, a security awareness test including a written components and a live action component. In some embodiments, the method 500 includes receiving 504, by a processor, a request from the user to access the computer system. In some embodiments, the method 500 includes querying 506, by the processor, the user for authentication credentials to validate a user identity. The authentication credentials may include a username and a password. The method 500 may further include validating 508 the user identity based on the authentication credentials.

The method 500 includes periodically administering 402, by a processor, the security awareness test to the user. In some embodiments, the security awareness test may be administered to the user on a quarterly or other periodic basis. In other embodiments, the security awareness test may be administered to the user on a randomized basis. In some embodiments, the security awareness test may be administered to the user in response to a request to access the computer system.

The security awareness test assesses 420 knowledge of the user with respect to ransomware and cybersecurity protocols of a computer system. In some embodiments, the security awareness test further assesses 422 knowledge of the user with respect to ransomware and cybersecurity protocols awareness and virus awareness. The method 500 includes generating 404, by a processor, a security awareness score based on performance of the user on the security awareness test.

Some embodiments of the method 500 include monitoring 406, by a processor, compliance of the user with the ransomware and cybersecurity protocols during computer system use. The security awareness score may be augmented in response to the monitoring 406. For example, in some embodiments, monitoring 406 compliance of the user may generate a compliance score that may increase, decrease, or otherwise augment the security awareness score.

In some embodiments, the method 500 periodically or randomly lowers 514 the security awareness score of the user by a particular amount so that the user will lose access all or a portion of the computing system. Thus, the user will be required to take the security awareness test again to potentially regain access to the computing system.

In some embodiments, the method 500 may determine 408 whether the security awareness test performance and/or the compliance has changed. In some embodiments, the determination 408 may be made continuously, periodically, intermittently, or randomly. In some embodiments, the determination 408 may be based on a change in the security awareness score and/or the compliance score.

If it is determined 408 that there has been a change, the method 500 may include updating 410 the security awareness score in response to changes to the performance and/or compliance. In some embodiments, a user level of access may be automatically updated 516 in response to the updated security awareness score.

In some embodiments, the method includes embedding 412, by a processor, the updated security awareness score of the user into a security chip of a hardware device of the computer system. In some embodiments, the security chip may include a TPM 126 of a server. In certain embodiments, embedding 412 the updated security awareness score includes embedding 518 the user level of access into the security chip. The hardware device communicates with the processor to deny the user access to at least a portion of the computer system based on the updated security score.

In the event the updated security awareness score does not meet a pre-determined threshold score for access to the requested computer system, access to the user may be denied 520. In some embodiments, denying 520 access to the user includes prompting 522 the user to obtain further training and/or re-take the security awareness test to increase the security awareness score.

Figure 6:
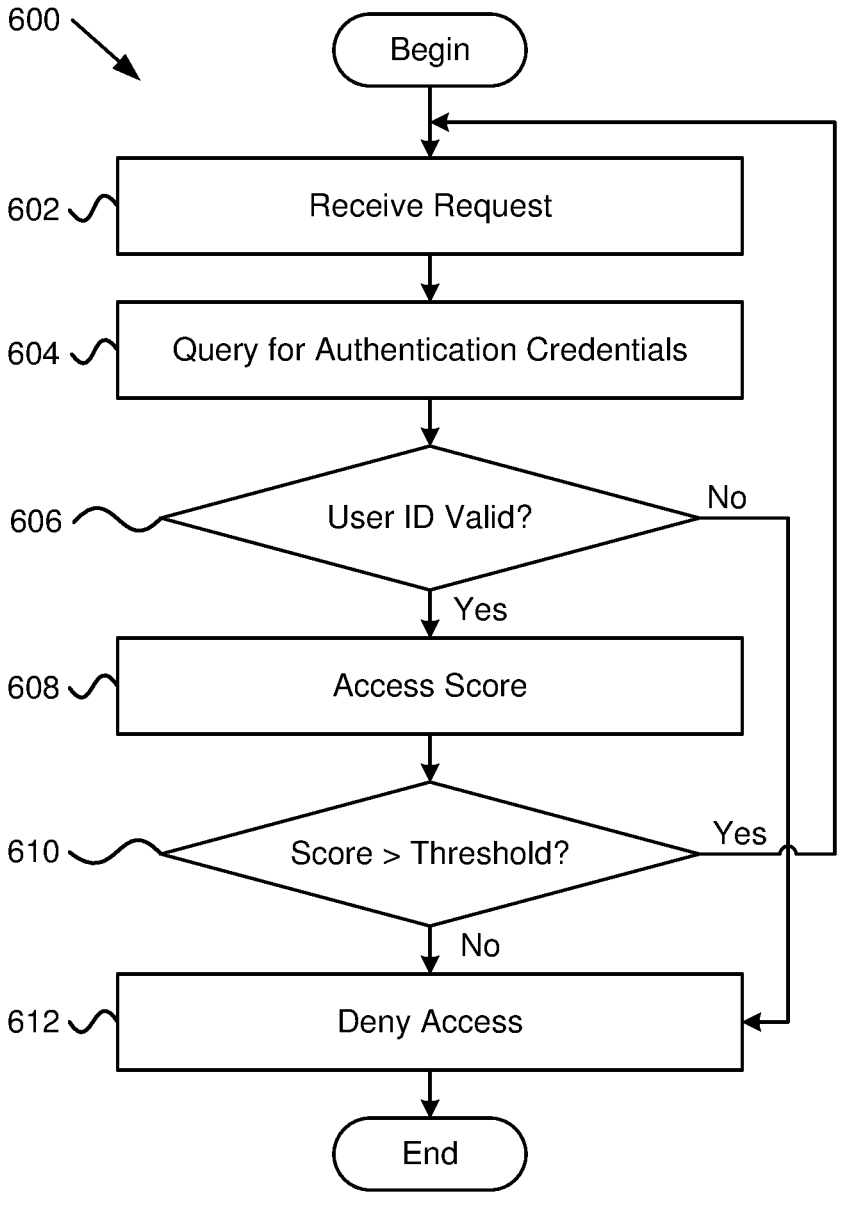
FIG. 6 is a schematic flow chart diagram illustrating a method for providing secured system access, according to various embodiments.

Referring now to FIG. 6, in some embodiments, a method 600 includes receiving 602, by a processor, a request from a user to access a computer system. The method 600 includes querying 604, by the processor, the user for authentication credentials to validate a user identity. The authentication credentials include a username and a password. The processor validates 606 the user identity based on the authentication credentials. If the authentication credentials are valid, the processor accesses 608 a security awareness score of the user and compares 610 the security awareness score to a score threshold required for access to the computer system. If the security awareness score does not meet the score threshold, the method 600 includes denying 612, by the processor, the user access to at least a portion of the computer system.

Figure 7:
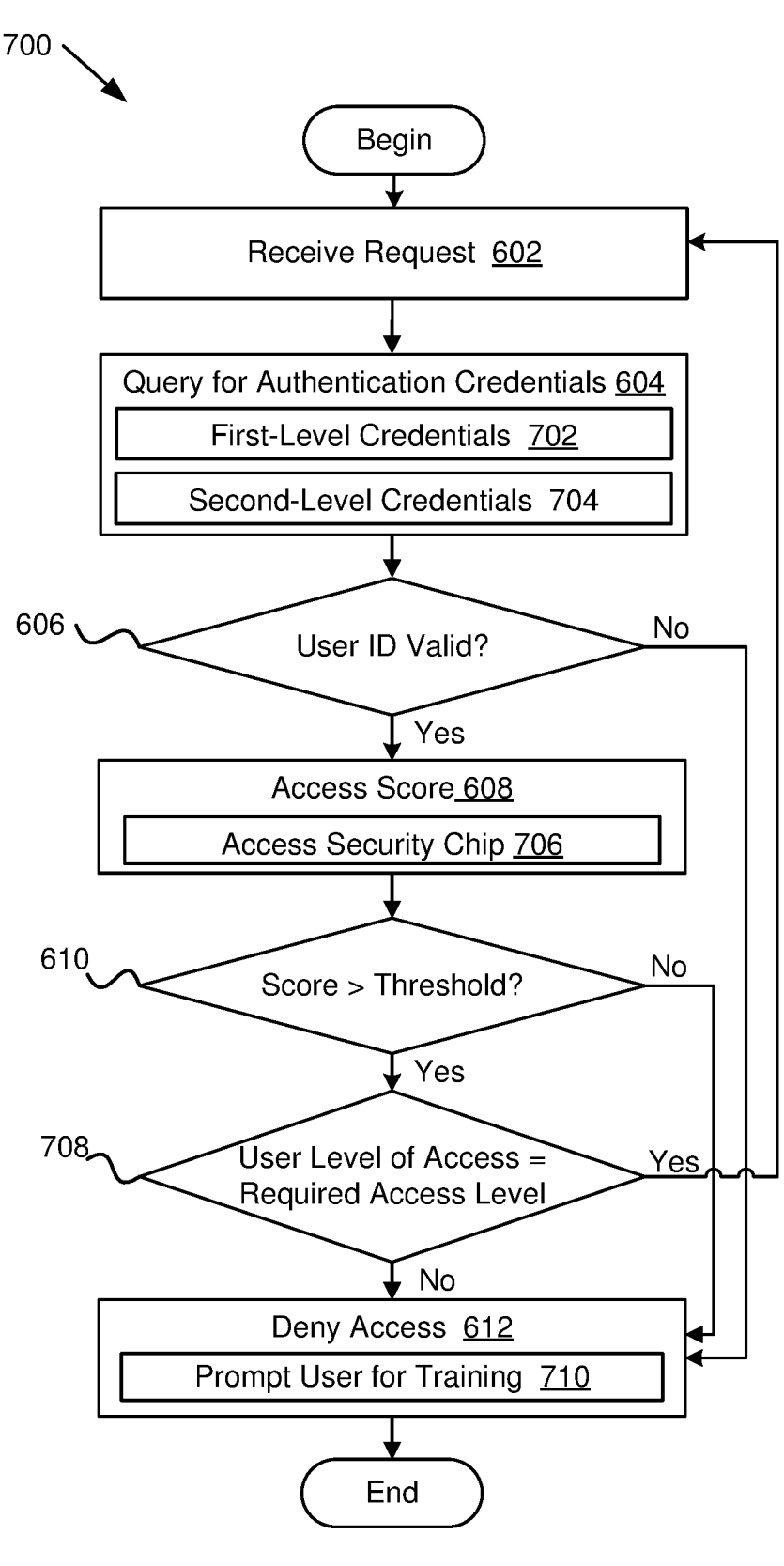
FIG. 7 is a schematic flow chart diagram illustrating an alternative embodiment of a method for providing secured system access.

Referring now to FIG. 7, in some embodiments, a method 700 for reducing users from falling victim of ransomware includes receiving 602, by a processor, a request from a user to access a computer system or portion thereof. The method 700 further includes querying 604, by the processor, the user for authentication credentials to validate a user identity. The authentication credentials may include first-level credentials 702 such as a username and a password, for example. In some embodiments, the authentication credentials may further include second-level credentials 704 such as a rolling code.

In some embodiments, the method 700 further includes determining 606, by the processor, whether the user identity is valid based on the authentication credentials 702, 704. In some embodiments, determining 606 whether the user identity is valid includes determining a required level of access for the requested portion of the computer system and determining whether a level of access associated with the user meets the required level of access. If the user identity is not valid, user access to the computer system may be denied.

If the user identity is valid, the method 700 proceeds to accessing 608 a security awareness score of the user. In some embodiments, the security awareness score may be accessed 706 from a security chip of a hardware device in the computer system. In some embodiments, the security awareness score may be generated 404 in response to the user's performance on a security awareness test, as set forth above with reference to FIG. 4. In some embodiments, the security awareness score may be embedded 412 in the security chip. In one embodiment, the security awareness score is embedded on a TPM 126 of a server. In other embodiments, the security awareness score may be accessed from one or more servers and/or other locations.

In some embodiments, the method 700 includes comparing the security awareness score to a score threshold to determine 610 whether the security awareness score meets the score threshold. If yes, the method 700 proceeds to determine 708 whether the user level of access meets the required access level for the computer system requested. If yes, access is granted to the user and the method 700 returns to await receiving 602 another request. If the security awareness score does not meet the score threshold or the user level of access does not meet the required access level for the computer system requested, the method 700 includes denying 612, by the processor, user access to at least a portion of the computer system. In some embodiments, the method 700 includes prompting 710 the user to obtain further training in the event that user access is denied. In other embodiments, prompting 710 the user may include enabling the user to retake the security awareness test. In some embodiments, the security awareness test must be re-taken within a pre-determined period of time for the user to regain access to the computer system.

In some embodiments, the method 700 further includes performing the steps illustrated in FIG. 4. Specifically, the method 700 includes periodically administering 402, by a processor, the security awareness test to the user. The security awareness test assesses knowledge of the user with respect to ransomware and cybersecurity protocols of a computer system. In some embodiments, the method 500 includes generating 404, by a processor, the security awareness score of the user based on performance of the user on the security awareness test and monitoring 406, by a processor, compliance of the user with the ransomware and cybersecurity protocols during use of the computer system. Some embodiments of the method 500 may include determining 408 whether the performance or the compliance has changed. In some embodiments, the processor may update 410 the security awareness score in response to changes to the performance and/or the compliance. The method 500 may include embedding 412, by a processor, the updated security awareness score of the user into a security chip of a hardware device of the computer system. In certain embodiments, the hardware device communicates with the processor to deny the user access to the at least a portion of the computer system based on the updated security awareness score.

In some embodiments, the steps of the method 400 and/or method 500 may be included in a computer program product. The computer program product may include a non-transitory computer readable storage medium storing code configured to be executable by a processor to perform operations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

periodically administering, by a processor, a security awareness test to a user, wherein the security awareness test assesses knowledge of the user with respect to ransomware and cybersecurity protocols of a computer system;

generating, by a processor, a security awareness score for the user based on performance of the user on the security awareness test;

monitoring, by a processor, compliance of the user with the ransomware and cybersecurity protocols during use of the computer system;

updating, by a processor, the security awareness score in response to changes to the performance of the user on the security awareness test and/or the compliance with ransomware and cybersecurity protocols during computer system use; and embedding, by a processor, the updated security awareness score of the user into a security chip of a hardware device of the computer system, wherein the hardware device communicates with the processor to deny the user access to at least a portion of the computer system based on the updated security awareness score falling below a score threshold.

2. The method of claim 1, wherein the security awareness test further assesses knowledge of the user with respect to cybercrime awareness and virus awareness.

3. The method of claim 1, further comprising prompting, by the processor, the user to obtain further training in response to that the user is denied access to the at least a portion of the computer system.

4. The method of claim 1, further comprising generating, by the processor, the security awareness test, wherein the security awareness test comprises a written component and a live action component.

5. The method of claim 1, further comprising determining a required level of access to enable access to the at least a portion of the computer system.

6. The method of claim 5, further comprising verifying that a user level of access corresponds to the required level of access.

7. The method of claim 6, further comprising automatically updating, by the processor, the user level of access in response to the updated security awareness score.

8. The method of claim 6, wherein embedding the updated security awareness score into the security chip further comprises embedding the user level of access into the security chip.

9. The method of claim 1, wherein periodically administering the security awareness test comprises periodically administering the security awareness test to the user in response to a request from the user to access the computer system.

10. The method of claim 1, wherein denying the user access to the at least a portion of the computer system comprises:

receiving, by a processor, a request from the user to access the computer system;

querying, by the processor, the user for authentication credentials to validate a user identity, the authentication credentials comprising a username and a password;

validating, by the processor, the user identity based on the authentication credentials;

accessing, by the processor, the updated security awareness score of the user;

comparing, by the processor, the security awareness score to a score threshold required for access to the computer system; and denying, by the processor, the user access to the at least a portion of the computer system in response to the security awareness score does not meet the score threshold.

11. The method of claim 1, further comprising automatically decreasing the security awareness score of the user on one of a periodic basis or a random basis to by an amount sufficient to prevent the user from accessing at least a portion of the computing system, and further comprising administering an additional security awareness test to the user to allow the user an opportunity to regain access to the at least a portion of the computer system.

12. A computer program product comprising a non-transitory computer readable storage medium storing code, the code being configured to be executable by a processor to perform operations comprising:

periodically administering a security awareness test to a user, wherein the security awareness test assesses knowledge of the user with respect to ransomware and cybersecurity protocols of a computer system;

generating a security awareness score for the user based on performance of the user on the security awareness test;

monitoring compliance of the user with the ransomware and cybersecurity protocols during use of the computer system;

updating the security awareness score in response to changes to the performance of the user on the security awareness test and/or the compliance with ransomware and cybersecurity protocols during computer system use; and embedding the updated security awareness score for the user into a security chip of a hardware device of the computer system, wherein the hardware device communicates with the processor to deny the user access to at least a portion of the computer system based on the updated security awareness score falling below a score threshold.

* * * * *